D. Lloyd,
Stencil Plates.
No. 495. Reissued Sep. 15, 1857.
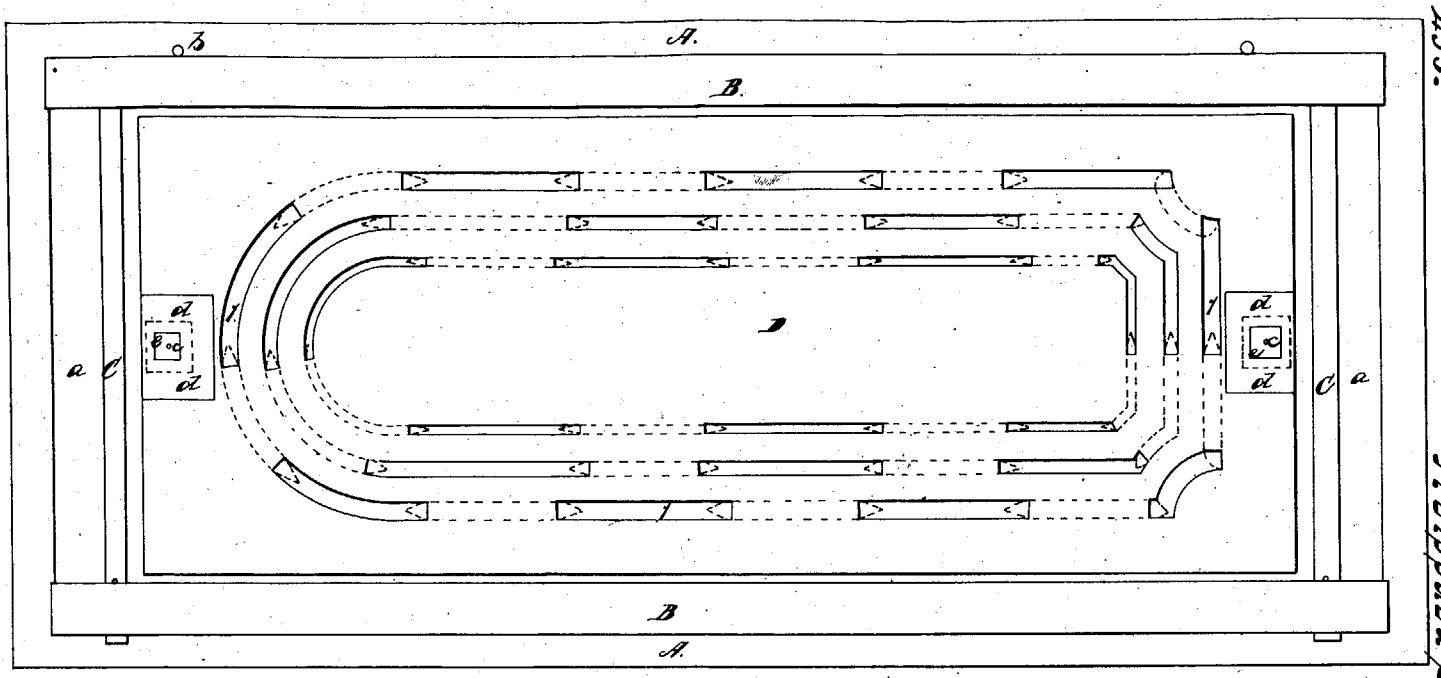
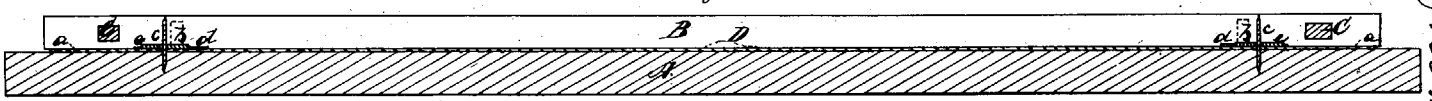

UNITED STATES PATENT OFFICE.

DANIEL LLOYD, OF NEW YORK, N. Y., ASSIGNOR TO GIBBONS L. KELTY AND DUDLEY M. FERGUSON.

IMPROVEMENT IN APPARATUS FOR STENCILING WINDOW-SHADES.

Specification forming part of Letters Patent No. 14,162, dated January 29, 1856; Reissue No. 495, dated September 15, 1857.

*To all whom it may concern:*

Be it known that I, D. LLOYD, of the city, county, and State of New York, have invented certain new and useful Improvements in the Apparatus Employed in Stenciling Window-Shades and other Articles; and I do hereby declare that the following is a full, clear, and exact description of the same, reference being had to the accompanying drawings, forming part of this specification, in which—

Figure 1 is a plan of my improved stenciling apparatus, and Fig. 2 is a longitudinal central section of the same.

Similar letters of reference indicate the same parts in both figures.

The nature of my invention consists in the mode of delineating long or continuous lines upon window-shades by means of stencils of the full size of the pattern required, prepared and registered in the manner hereinafter described.

To enable others to make and use my invention, I will proceed to describe its construction and operation.

A is the table or bench and B B C C is the wooden frame upon which the shade *a* is strained. The frame is of the usual construction, consisting simply of two side pieces, B B, with transverse stretchers C C; and the shade *a*, which is tinted blue in Fig. 1 and shown by a single blue line in Fig. 2, is strained and attached on one side of it in the usual manner. Near one side of the upper surface of the table are placed two fixed stops, *b b*, or, in place of these stops, a long strip may be used.

D is one of a set of stencils prepared as follows: Upon a sheet of suitable paper of sufficient size to contain the whole design that portion of the pattern is drawn which is to be of one color. Certain portions are cut out, (about one-half, as shown by the blue tints, No. 1.) Upon each end of the stencil is placed a small piece, *e*, of tin plate or other thin metal, perforated with a small hole. These are fixed in position by a piece of paper of greater extent being glued over them. The frame B C, containing the shade *a*, is placed on the bench A, with one of its sides against the stops *b b* to steady the frame. The stencil D, previously prepared, is placed upon the shade in the proper position to bring the pattern in the center of the shade. Metal pins of a size to fit the holes in the perforated plates are driven down through them and the shade into the bench A. The stencil D is then removed from the pins and another paper of the same size placed thereon, the pins being left sticking in the bench. Two other plates, *e*, previously perforated, are placed on the pins *c* and secured to the second stencil in the manner before described. The first stencil, D, is then placed on the pins *e* and brushed over with color, in the usual manner, until its openings are thus stenciled upon the second one. They are then both removed, and the blanks left upon the second stencil, which are required to finish that portion of the pattern, are cut out, the openings thus made extending into the colored portions, as shown by the red lines in Fig. 1, for the purpose of better preventing any break in the continuity of the pattern. The other colors of the design are placed upon the shade through other pairs of stencils in the same manner.

This invention, though extremely simple and apparently unimportant, is of vast importance in the manufacture of window-shades, as will be understood when its operation is compared with the ordinary process of stenciling. The ordinary process is to lay down the frame upon a table without any guides thereon, then to lay down the first stencil and adjust it carefully to its proper position, where it is secured by laying weights upon it. When this stencil has been used, it is removed and the next is laid down, and has to be adjusted by bringing its cuts or openings to a proper position relatively to the impression produced by the first operation, and so on with the whole set. In this way it has not been possible to produce shades of elaborate patterns by a single set of stencils, but the shade has been stenciled in sections, each section requiring a separate set of stencils, and after all the shade generally requiring to be finished by hand.

When the color is required to be placed in detached portions of small extent, a single stencil may answer, but when the lines are long or continuous it is necessary to use two, constructed substantially as I have before described, and in connection therewith to use my plates *e* and movable pins to insure the perfect register of the stencil and their proper positions upon the shade.

Having thus fully described my invention, what I claim as new, and desire to secure by Letters Patent, is—

1. Producing patterns on window-shades, in which long or continuous lines form a prominent feature, by means of a pair or pairs of stencils of the full size of the design, prepared substantially in the manner herein set forth.

2. The mode of registering the stencils by the use of the plates *e* and pins *c*, for the purpose of adjusting and readily adapting the stencils to shades, as herein specified.

DANIEL LLOYD,
Per GIBBONS L. KELTY,
DUDLEY M. FERGUSON,
*Assignees of entire right.*

Witnesses:
C. R. GRITMANE,
LEMUEL W. SERRELL.